(12) United States Patent
Srinivasan et al.

(10) Patent No.: US 10,871,917 B2
(45) Date of Patent: Dec. 22, 2020

(54) PRESCRIPTIVE ANALYTICS BASED OPERATION-RATE SIZING STACK FOR CLOUD STORAGE

(71) Applicant: Accenture Global Solutions Limited, Dublin (IE)

(72) Inventors: Madhan Kumar Srinivasan, Bangalore (IN); Arun Purushothaman, Chennai (IN); Guruprasad Pv, Bangalore (IN); Kishore Kumar Gajula, Telangana (IN)

(73) Assignee: Accenture Global Solutions Limited, Dublin (IE)

( * ) Notice: Subject to any disclaimer, the term of this patent is extended or adjusted under 35 U.S.C. 154(b) by 111 days.

(21) Appl. No.: 16/285,539

(22) Filed: Feb. 26, 2019

(65) Prior Publication Data
US 2020/0272355 A1 Aug. 27, 2020

(51) Int. Cl.
*G06F 3/06* (2006.01)

(52) U.S. Cl.
CPC .......... *G06F 3/0655* (2013.01); *G06F 3/0604* (2013.01); *G06F 3/067* (2013.01); *G06F 3/0611* (2013.01); *G06F 3/0629* (2013.01); *G06F 3/0631* (2013.01)

(58) Field of Classification Search
CPC ............... G06F 11/0712; G06F 11/301; G06F 11/3452; G06F 2009/4557; G06F 2009/45591; G06F 2009/45595; G06F 2209/501; G06F 3/0604; G06F 3/0629; G06F 3/0631; G06F 3/067; G06F 3/061; G06F 3/0611; G06F 3/0614; G06F 3/0632; G06F 3/0683; H04L 41/0806; H04L 41/145; H04L 41/16
See application file for complete search history.

(56) References Cited

U.S. PATENT DOCUMENTS

| 9,971,548 | B1 | 5/2018 | Talwar et al. |
| 2014/0325149 | A1* | 10/2014 | Misra ...................... G06F 3/067 711/114 |
| 2016/0259569 | A1 | 9/2016 | Povzner et al. |
| 2019/0079848 | A1 | 3/2019 | Srinivasan et al. |
| 2019/0179675 | A1 | 6/2019 | Srinivasan et al. |
| 2019/0205150 | A1 | 7/2019 | Srinivasan et al. |
| 2020/0236085 | A1* | 7/2020 | Spurlock ............... H04L 63/166 |

OTHER PUBLICATIONS

U.S. Appl. No. 16/154,174, filed Oct. 8, 2018.
U.S. Appl. No. 16/219,435, filed Dec. 13, 2018.
U.S. Appl. No. 16/411,064, filed May 13, 2019.
U.S. Appl. No. 16/423,720, filed May 28, 2019.
Extended European Search Report of European application 20159200. 3, dated Aug. 14, 2020, 7 pages.

* cited by examiner

*Primary Examiner* — Reginald G Bragdon
*Assistant Examiner* — Thanh D Vo
(74) *Attorney, Agent, or Firm* — Brinks Gilson & Lione

(57) ABSTRACT

A multi-layer rate sizing stack may generate prescriptive operation-rate tokens for controlling sizing adjustments for operation-rates. The input layer of the rate sizing stack may generate operation pattern data based on operation-rate data received via network connection. A prescriptive engine layer may determine a prescriptive allowed operation-rate based on the operation pattern data. Based on the prescriptive allowed operation-rate, the prescriptive engine layer may generate the operation-rate tokens that that may be used to control rate sizing adjustments prescriptively.

20 Claims, 6 Drawing Sheets

PRESCRIPTIVE ANALYTICS BASED OPERATION-RATE SIZING STACK FOR CLOUD STORAGE

TECHNICAL FIELD

This disclosure relates to operation-rate sizing via a prescriptive analytics based rate sizing stack.

BACKGROUND

Rapid advances in communications and storage technologies, driven by immense customer demand, have resulted in widespread adoption of cloud systems for managing large data payloads, distributed computing, and record systems. As one example, modern enterprise systems presently maintain data records many petabytes in size in the cloud. Improvements in tools for cloud resource allocation and consumption prediction will further enhance the capabilities of cloud computing systems.

DETAILED DESCRIPTION

Figure 1:
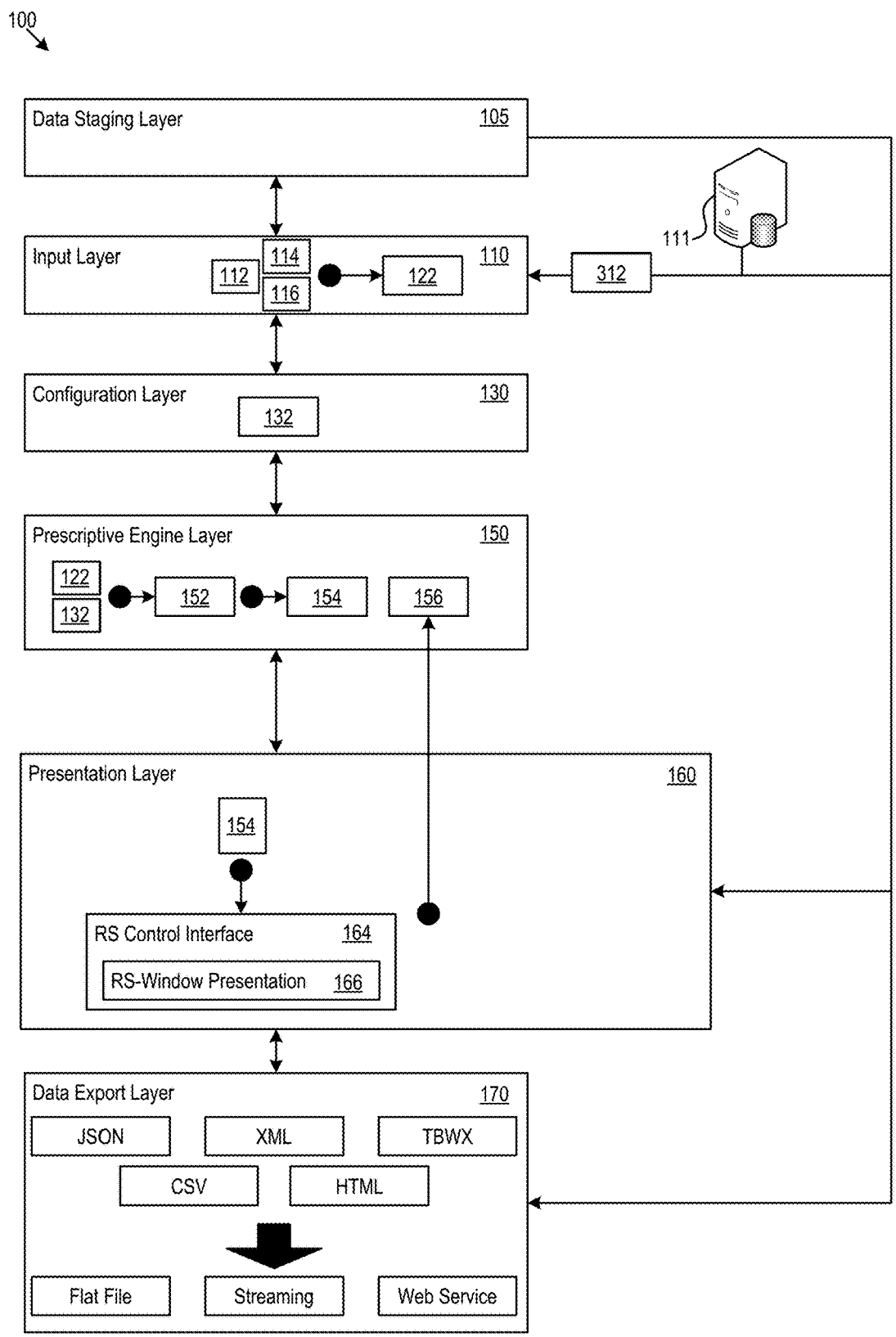
FIG. 1 shows an example multiple-layer rate sizing stack.

In cloud computing systems, storage volumes (e.g., one or more portions of a harddrive (HDD), solid-state disk (SSD)) may be reserved for computing usage. Various different storage options may support different allowed operation-rates (e.g., input/output operations per second (IOPS) or operation-rate measures). In some cases, a reservation (of even an appropriate volume) may represent on underprovision or overprovision of an allowed operation-rate for a particular storage volume. Although the storage volume may (or may not) have sufficient storage to meet provisioned needs, the same storage volume may have a provisioned allowed operation-rate that is too high or low given the storage operation traffic for that particular storage volume. For example, a provisioned storage volume may have a provisioned allowed operation-rate, e.g., the number of storage operations that the storage volume is allowed to handle in a given time interval, that is twice as high as the peak operation-rate demanded to support storage operation traffic on the storage volume. Accordingly, in this illustrative example, the provisioned allowed operation-rate for the storage volume could be reduced without necessarily causing a corresponding reduction in performance in handling the expected peak operation-rate for the storage volume. Accordingly, resources dedicated to the overprovisioning of the allowed operation-rate (that does not improve computing performance) could instead be applied to other computing resources that may improve computing performance. Conversely, an underprovisioned storage volume may be operated continually at (or over) capacity and may be unable to fulfill storage volume operation requests without latency. For example, an underprovisioned storage volume, in some cases, may reject or be non-responsive to over-capacity requests. Accordingly, an over-sized or under-sized allowance in operation-rate may lead to performance degradation or inefficient deployment of hardware resources.

Accordingly, increased operation-rate sizing accuracy provides a technical solution to the technical problem of system inefficiency by increasing the utilization and efficiency of cloud storage volume resources. The rate sizing stack techniques and architectures described below may be used to prescribe operation-rate sizing prescriptions. Further, the determination of the operation-rate sizing prescriptions may rely on data sources such as, operation-rate data, expenditure report data for resource reservation/activation, computing resource consumption metric data, activation request data, functional grouping data, topological or relationship data, tagging data, or other metadata. Thus, a rate sizing stack may provide prescriptive analytical sizing correction taking into account allowed operation-rate utilization patterns, storage volume types, volume type availability, consumption metric data, workload and topological data, geographic data, and/or other data. Thus, the disclosed rate sizing stack techniques and architectures improve the operation of the underlying hardware by increasing computing efficiency and provide an improvement over existing solutions. Further, the rate sizing stack techniques and architectures provide a practical solution to the technical problem of efficient storage volume provision.

The rate sizing stack 100 may analyze historical operation-rate data, tagging data and consumption metric data to predict future utilization and produce prescriptive recommendations. Operation-rate data, may include, for example, historical data related to usage or activation of storage volumes, e.g., storage volume allocation history, activation/reservation/committed-use history data, expenditure report data for resource reservation/activation/committed-use, processor activity, memory usage history, storage volume input/output operation history. computing cycles, data throughput, or other utilization metrics, seasonal usage cycles e.g., holiday schedules, daily usage cycles, weekly usage cycles, quarterly usage cycles or other data. Tagging data may include storage volume (or other computing resource) specific data. For example, tagging data may include data provided by an operator, provisioning or configuration management system, or an analyzed system detailing functional groupings (e.g., project-specific allocations, hardware (including virtualized hardware) marked for a specific purpose, availability zones, operating systems applications, installed software, or other groupings), quality of service requirements, minimum allocations, environmental data, license tags, or other tagging data. Consumption metric data may include computing resource specific cost metrics such as expenditure-per-time or resource-per-time metrics.

FIG. 1 shows an example multiple-layer rate sizing stack 100, which may execute on rate sizing circuitry making up the hardware underpinning of the rate sizing stack 100. In this example, the rate sizing stack 100 includes a data staging layer 105, an input layer 110, a configuration layer 130, a prescriptive engine layer 150, a presentation layer 160, and a data export layer 170. The rate sizing stack 100 may include a multiple-layer computing structure of hardware and/or software that may provide prescriptive analytical recommendations (e.g., prescriptive allowed operation-rates) through data analysis.

In some implementations, as discussed below, IOPS-RS Engine—a Dynamic IOPS Right-Sizing Recommendation Engine developed by Accenture® Bangalore may be operated as the rate sizing stack 100.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example for the rate sizing stack 100, the data staging layer 105 may provide the input layer 110 with storage resources to store operation pattern data within a database. Hence, the data staging layer 105 may provide a hardware resource, e.g., memory storage resources, to the input layer 110. Accordingly, the multiple-layer stack architecture of the rate sizing stack may improve the functioning of the underlying hardware.

Figure 2:
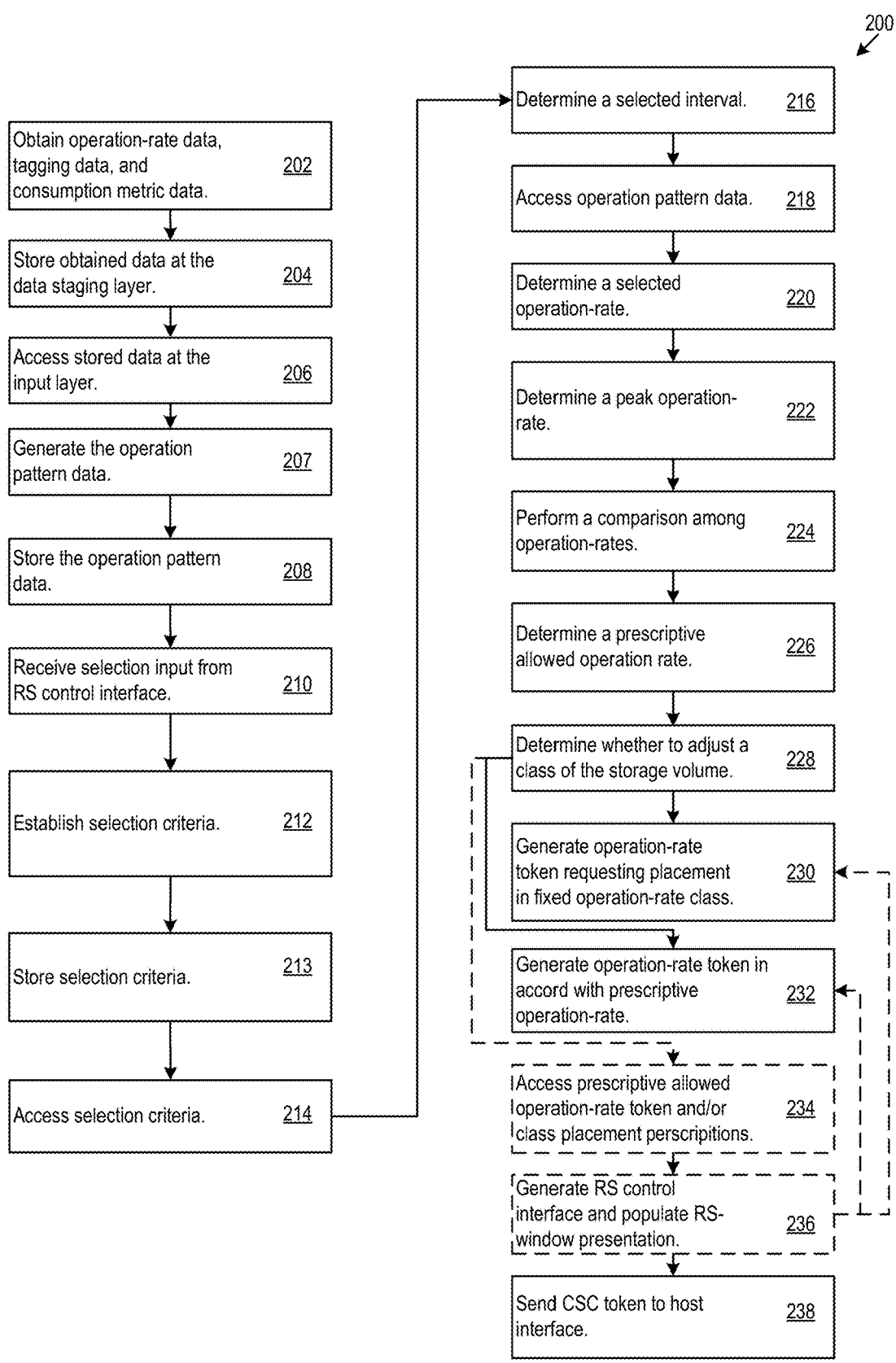
FIG. 2 shows example rate sizing stack logic.

In the following, reference is made to FIG. 1 and the corresponding example rate sizing stack logic (RSSL) 200 in FIG. 2. The logical features of RSSL 200 may be implemented in various orders and combinations. For example, in a first implementation, one or more features may be omitted or reordered with respect to a second implementation. At the input layer 110 of the rate sizing stack 100, the RSSL 200 may obtain operation-rate data 112, consumption metric data 114, and tagging data 116 (202) and then store the obtained data at the data staging layer 105 (204). In some cases, the operation-rate data 112, consumption metric data 114, and tagging data 116 may be received via communication interfaces (e.g., communication interfaces 312, discussed below). The operation-rate data 112, consumption metric data 114, and tagging data 116 may be accessed at least in part, e.g., via the communication interfaces 312, from data sources 111, which may include, operation-rate history databases, cloud expenditure databases, master virtual machine cost databases, use-history databases, storage access logs, virtual machine family/template description data, infrastructure/project tags or other data sources. The operation-rate data 112 may be provided by cloud operation-rate history databases, cloud expenditure databases, committed-use history databases, or other utilization data sources. The consumption metric data 114 may be provided by cloud expenditure databases, master virtual machine cost databases, virtual machine family/template/platform as a service, description data, or other consumption metric data sources. The tagging data 116 may be provided by virtual machine family/template description data, infrastructure/project tags or other tagging data sources.

After the operation-rate data 112, consumption metric data 114, and tagging data 116 are obtained and stored, the input layer 110 may access the some or all of the stored data (206) using memory resources passed from the data staging layer 105 (e.g., memory access resources). The input layer 110 may process the operation-rate data 112 to generate operation pattern data 122 for the storage volumes (207). For example, the input layer may reformat operation-rate data obtained from multiple sources into a common format for analysis. The common format may be a selected format to which data in other formats are translated. In some cases, the operation pattern data 122 may include a time-correlated history and cycle analysis of past computing storage volume operations to facilitate determination of likely patterns of future usage, e.g., for individual storage volume, computing resources within a functional group, or other groups of computing resources that include one or more storage volumes.

In some cases, the techniques and architectures used in conjunction with an activation timetable stack such as that described in U.S. patent application Ser. No. 15/811,339, filed Nov. 13, 2017, entitled Prescriptive Analytics Based Activation Timetable Stack for Cloud Computing Resource Scheduling, which is entirely included herein by reference, may be used to perform or assist in generation of the operation pattern data 122. Therein, the input layer of the activation timetable stack may parse historical utilization data, consumption metric data, and tagging data to identify patterns at multiple timescales. The input layer of the activation timetable stack may then generate time-correlated consumption data. In an illustrative scenario of how the rate sizing stack 100 may utilize the activation timetable stack outputs, the parsing of the operation-rate data (e.g., in place of the historical utilization data), consumption metric data, and tagging data, done by the input layer of the activation timetable stack may be implemented by the input layer 110 of the rate sizing stack 100 to generate the operation pattern data 122 (206).

Additionally or alternatively, to process the stored data 112, 114, 116, the input layer 110 may analyze time components of the stored data 112, 114, 116 to determine time related patterns. For example, the input layer 110 may identify weekly, monthly, holiday, seasonal, or other time cycles present within the stored data 112, 114, 116. Time-independent data, such as, non-conditional functional group assignments, may be applied to all time periods. However, temporal or otherwise dynamic functional groupings may be correlated to corresponding timescales.

In some implementations, to generate the operation pattern data 122, the input layer 110 may determine one or more timescales (e.g., timescales including time-invariant contributions) present within the data. For example, the input layer 110 may apply various frequency analyses to the data to determine periodic, aperiodic, and/or time-invariant trends. Additionally or alternatively, the input layer 110 may apply rule-based analyses such as holiday schedules, operational hours, or annual enterprise cycles that may be expressly defined by rules rather than through inferential analysis.

Once the operation pattern data 122 is generated, the input layer 110 may store the operation pattern data 122, via a database operation at the data staging layer 105 (208). For example, the operation pattern data 122 may be stored on storage dedicated to the RSSL 200. Additionally or alternatively, the operation pattern data 122 may be stored on a shared database or cloud storage. Accordingly, the data staging layer 105 may further access network resources (e.g., via communication interfaces 312, discussed below) to implement memory resource provision to the other layers. In an example implementation, the RSSL 200 may be defined within a Revolution-R environment. However, other design platforms may be used.

At the configuration layer 130 of the rate sizing stack 100, the RSSL 200 may determine one or more selection criteria 132. The selection criteria 132 may include threshold values (e.g., percentile values, standard deviations, a predefined median value offset, average value offsets, inflection point values), values for extrema (e.g., minimum, maximum), averages, values representing a degree of change from previous values, or other criteria for selection of one or more operation-rates from among a group or distribution of operation-rates. In an example scenario, a selection criteria may include selecting an operation-rate representative of a 99th percentile value of an operation-rate distribution.

The selection criteria 132 may be established based on operator input, e.g., via the rate sizing (RS) control interface 164, as discussed below. For example, the RSSL 200 may receive selection input from the RS control interface 164, as discussed below (210). Using the selection input, the RSSL 200 may establish the selection criteria (212) to facilitate the selection of an operation-rate in line with the selection input received from the RS control interface 164. Once, the RSSL 200 establishes the selection criteria 132, the RSSL 200 may store the selection criteria 132 via operation at the data staging layer 105 (213).

In various implementations, the RSSL 200 may access the operation pattern data 122 via a memory resource provided by the data staging layer 105 (214). Using the operation pattern data, including the timescales determined therein (e.g., at the input layer, as discussed above), the configuration layer may determine a selected interval over which the operation pattern data may be parsed for analysis (216). The selected interval may refer to a duration for which an operation-rate is calculated, forecasted, or otherwise analyzed. For analysis window, the window may be parsed into multiple intervals for each storage volume analyzed. The operation-rate determined for an interval, e.g., at the prescriptive engine layer 150, may reflect an operation-rate observed or predicted for that interval. The operation-rate of a particular interval may not necessarily be representative of other operation-rates for other intervals during the analysis window. Accordingly, the distribution of group of operation-rates over the multiple intervals within the window may be used to characterize the activity level of a given storage volume. Further, as discussed below with regard to the prescriptive engine layer 150, the RSSL 200 may select a selected operation-rate from among the group of operation-rates using the selection criteria.

The prescriptive engine layer 150 may access the operation pattern data 122, the selection criteria 132, and/or the selected interval using a memory resource provided by the data staging layer 105 (218). For example, the data staging layer 105 may provide a memory read resource (such as a SQL database read resource access to metadata characterizing content within a data foundation such as those described in U.S. patent application Ser. No. 16/235,815 filed Dec. 28, 2018 and incorporated entirely herein) to the prescriptive engine layer 150 to allow access to the operation pattern data 122.

As discussed above, using the selected interval, the RSSL 200, at the prescriptive engine layer 150, may parse the operation pattern data 122 within the analysis window into intervals. The selected interval may result in periodic and/or aperiodic parsing of the window. For example, the window may be parsed into multiple intervals of equal duration. Such periodic grouping may ensure that periods of equal duration receive equal weight and/or predictable relative weights. In another example, the window may be parsed into multiple intervals, while grouping extended continuous periods of inactivity and/or periods without activity level change into single intervals. For example, such aperiodic grouping may, in some cases, avoid overweighting of periods of no activity when applying the selection criteria 132.

Using the operation pattern data 122 and/or the selection criteria 132, the RSSL 200, at the prescriptive engine layer 150, may determine a selected operation-rate from among the multiple operation-rates of the intervals (220). For example, if the selection criteria detailed that the selected operation-rate should include an operation-rate representative of the $99^{th}$ percentile of operation-rates, the RSSL 200 would compare the operation-rates and select the rate closest in rank to the $99^{th}$ percentile. Depending on the number of intervals in the window, the selected operation-rate may be exactly the $99^{th}$ percentile rate or the rate closest thereto in ranking. In some cases, the rate just above the $99^{th}$ percentile (or, in other examples, just above another threshold established via the selection criteria) may be selected (even when a lower operation-rate may be closer in ranking to the $99^{th}$ percentile) to ensure that the $99^{th}$ percentile operation-rate is supported if the selected operation-rate is implemented as the prescriptive allowed operation-rate 154.

The RSSL 200, at the prescriptive engine layer 150, may further determine a peak operation-rate (222). The peak operation-rate may, in some cases, include the highest operation-rate from among the multiple operation-rates for the intervals. Selection of the highest operation-rate may ensure that the highest operation-rate is included in the analysis by the RSSL 200 at the prescriptive engine layer 150. In some cases, the peak operation-rate may include a determined local maximum, e.g., without necessarily including a global maximum. In some cases, the peak operation-rate may be higher the than the highest operation-rate for the multiple intervals. For example, the peak operation-rate may include an operation-rate from another storage volume, such as, another storage volume within the same functional group. Additionally or alternatively, the peak operation-rate may be a predicted maximum operation-rate that may not necessarily have been associated with any particular interval within the analysis window. For example, the peak operation-rate may be the maximum recorded interval within an analysis window (e.g., 90-day analysis window) with an added upper bound from a confidence interval corresponding to when the data is generalized to any 90-day window within a 1-year period.

Once the selected and peak operation-rates are determined, the RSSL 200 may perform a comparison among the selected, peak, and provisioned allowed operation-rates (224). The provisioned allowed operation-rate may refer to the highest operation-rate currently allowed by the storage volume provider based on current provisioned preferences. Accordingly, at the provisioned allowed operation-rate, the provider may throttle or cap the operation-rate. In some cases, the RSSL 200 may calculate ratios between the selected and provisioned allowed operation-rates and/or peak and provisioned allow operation-rates to facilitate the comparison. Further, in some cases, the RSSL 200 may calculate differences between calculated ratios to perform the comparison.

Based on the comparison, the RSSL 200, at the prescriptive engine layer 150, may determine a prescriptive allowed operation-rate 154 (226). For example, the may determine a prescriptive allowed operation-rate 154 from among the selected and peak operation-rates as a result operation-rate 152. In the example, the result operation-rate 152 may have an offset or other alteration applied before serving as the prescriptive allowed operation-rate 154.

In an illustrative example, a buffer adjustment may be added to the result operation-rate to obtain the prescriptive allowed operation-rate 154. The buffer adjustment may include a percentage adjustment (e.g., 5%, 10%, 15%, or other percentage) to add to the result operation-rate 152 to ensure that the prescriptive allowed operation-rate 154 supports system performance greater than that of the result operation-rate 152. In some cases, the buffer adjustment may be selected based on input from the RS control interface 164, as discussed below. Further, in some cases, multiple buffer adjustments may be implemented and the RSSL 200 may select among the multiple buffer adjustments based on the comparison among the selected, peak, and provisioned allowed operation-rates.

The RSSL 200 may define conditions which support selection of one or the other of the selected and peak operation-rates. For example, the conditions may include comparison of calculated ratios to analysis thresholds. For example, the analysis threshold may include a first threshold ratio, a second threshold ratio, and a third threshold ratio. In the example, the ratio between the selected and provisioned allowed operation-rates may be compared to the first threshold ratio; the ratio between the peak and provisioned allowed operation-rates or the difference between the two calculated ratios discussed above may then be compared to either the second or third threshold ratios depending on the result of the comparison involving the first threshold ratio. Once the ratio comparisons are complete, the RSSL 200 may select the result operation and/or an offset or alteration to apply to the result operation-rate 152.

In an illustrative example, the first threshold ratio may be selected (e.g., based on operator input) and the second and third threshold ratios may be determined based on the first ratio. In various other cases, the any or all of the first, second, and third ratios may be selected or based on the others. Referring again to the illustrative example, the second threshold ratio may include a complementary ratio (e.g., the complement) to the first ratio. For example, the first threshold ratio may be "$\alpha$" and the second threshold ratio may be the complement of a, e.g., $(1-\alpha)=\beta$. The third threshold ratio may be half of the second threshold ratio, e.g., $(1-\alpha)/2=\gamma$. Accordingly, in the illustrative example, if $\alpha$ is specified then the complement of $\alpha$ and half of the complement of $\alpha$ are also both specified.

Before or during the comparison among the selected, peak, and provisioned allowed operation-rates, the RSSL 200 may determine whether to adjust the class of the storage volume based on a comparison of the peak operation-rate and a static threshold operation-rate (228). In some cases, the static threshold operation-rate may be based on the maximum operation-rate supported by a fixed operation-rate storage class for the storage volume. In some cases, a fixed operation-rate storage class may support a fixed ratio of allowed operation-rate to storage volume. For example, the fixed ratio operation-rate to storage volume (in gigabytes) may be 3 up to a global maximum operation-rate (e.g., 10,000 IOPS or other defined maximum). A variable operation-rate storage class may support a variable ratio (e.g., in the range of 2 to 50) up to a higher global maximum operation-rate (e.g., 32,000 IOPS or other defined maximum). Accordingly, for a fixed operation-rate storage class, the maximum allowed operation-rate (e.g., $\pi$) may be the fixed ratio times the storage volume or the global maximum (whichever is lower). For a variable operation-rate storage class, the provisioned allowed operation-rate (e.g., $\rho$) may be a selected ratio (from the allowed range) times the storage volume or the global maximum (whichever is lower). In some cases, in a variable operation-rate storage class the corresponding cost metric for the class may be dependent on $\rho$.

In some cases, the static threshold operation-rate may be determined by adjusting the maximum allowed operation-rate (e.g., $\pi$) for the fixed storage class. For example, the RSSL 200 may subtract an adjustment buffer from $\pi$ to obtain the static threshold rate. Adjusting $\pi$ to obtain the static threshold may ensure that selection of or continued use of the fixed operation-rate storage class may allow for operation without performance degradation or degradation above a given tolerance.

In some cases, the RSSL 200 may also determine whether to increase the size of the storage volume to increase $\pi$ (e.g., up to the global maximum), even if the extra volume may remain unused. For example, $\pi$ may be taken to be the global maximum regardless of the current size of the storage volume because increasing fixed operation-rate storage class storage volume size may be associated with lower cost metrics than adopting a variable operation-rate storage class and increasing a provisioned allowed operation-rate. Other strategies may include merging previously separately provisioned storage volumes (e.g., two storage volumes with uncorrelated or anti-correlated activity patterns). Statistical multiplexing analyses may be used to implement storage volume merges.

When the peak operation-rate is below the static threshold operation-rate, the RSSL 200 may generate an operation-rate token 156 (e.g., an instruction set for control of a host interface of operation-rate provisioning) requesting placement of the storage volume in the fixed operation-rate storage class (230). As discussed below, the placement of storage volume and the content of the operation-rate token 156 may be subject to operator-provided adjustments received via the RS control interface 164.

When the peak operation-rate is below the static threshold operation-rate, the RSSL 200 may generate an operation-rate token 156 requesting placement of the storage volume in the variable operation-rate storage class and an operation-rate reservation (e.g., an operation-rate provisioning instruction) in accord with the determined prescriptive allowed operation-rate 154 (232). As discussed below, the placement of storage volume and the content of the operation-rate token 156 may be subject to operator-provided adjustments received via the RS control interface 164.

Table 1 shows example pseudocode for an instantiation of the above illustrative example where a is specified to be 70% and the selected operation-rate is the $99^{th}$ percentile operation-rate (e.g., p99). The example pseudocode may be used by RSSL 200 at the prescriptive engine layer 150 to implement the comparison among the selected, peak, and provisioned allowed operation-rates. The instantiation uses two adjustment buffers (e.g., "hi_buff" and "lo_buff", which are set to be 10% and 5%, respectively). The static threshold operation-rate is $\pi$lo_buff. The selection structure shown in the pseudocode may be used with other values of $\alpha$, hi_buff, and lo_buff.

TABLE 1

Example Pseudocode Description

| Example Routine | Recommended IOPS Volume* <= if peak < ($\pi$ − hi_buff) then downsize class or 0<br><= if (p99_prov_ratio < $\alpha$ & peak_p99_diff > $\beta$) then (p99 + lo_buff)<br><= if (p99_prov_ratio < $\alpha$ & peak_p99_diff <= $\beta$) then ( peak + lo_buff)<br><= if (p99_prov_ratio >= $\alpha$ & peak_p99_diff > $\gamma$) then ( p99 + hi_buff)<br><= if (p99_prov_ratio >= $\alpha$ & peak_p99_diff <= $\gamma$) then ( if (peak + hi_buff) < prov_iops then (max + hi_buff) else prov_iops)<br>Transition Flag <− if [ (Recommended IOPS Volume <= EBS Volume (in GBs) * 50) & (Recommended IOPS Volume >= EBS Volume (in GBs) * 2)] then "Recommend RS" else "Do not RS"]<br>where,<br>    peak = peak operation-rate for the given analysis window |
|---|---|

TABLE 1-continued

Example Pseudocode
Description

π = maximum IOPS the recommended fixed operation-rate class can provide
   p99 = 99th percentile utilization value for the given time-period
  peak_prov_ratio = maximum utilization value over provisioned allowed operation-rate
  p99_prov_ratio = p99 value over provisioned allowed operation-rate
  diff_peak_p99 = the difference between the peak_prov_ratio and p99_prov_ratio
  prov_ops = provisioned allowed operation-rate
  hi_buff = larger of the two defined adjustment buffers (e.g., 10%)
  lo_buff = larger of the two defined adjustment buffers (e.g., 5%)
  α = 70%
  β = (100% − α)
  γ = (β/2) %
  α, β, γ = threshold ratios (70%, 30% and 15% respectively, which may be defined
through operator input)
  Transition Flag = this flag decides whether the storage volume is capable of
prescriptive allowed operation-rate without size adjustment for the allowed ratios of operation-
rate to storage volume size (e.g., 2 to 50)

In some implementations, prior to generation of the operation-rate token, the presentation layer 160 may access the prescriptive allowed operation-rates 154 and/or class placement prescriptions for the storage volume (234). The presentation layer 160 may merge the prescriptive allowed operation-rates 154 and/or class placement prescriptions with consumption metric data to generate consumption saving data corresponding to the prescriptive allowed operation-rates and/or class placement prescriptions. When dealing with multiple prescriptions for multiple storage volumes, the presentation layer 160 may sort the storage volumes according to consumption savings, functional groups, adjustment magnitude, or other variables. The presentation layer 160 may generate the RS control interface 164 and populate the RS-window presentation 166 with the prescriptive allowed operation-rates and/or class placement prescriptions and accompanying data and options (236).

The RS control interface may receive operator commands, e.g., accepting and/or rejecting prescriptive allowed operation-rates and/or class placement prescriptions. The RSSL 200 may incorporate the operator commands, and, at the prescriptive engine layer 150, generate the operation-rate token 156 (230, 232). The operation-rate token 156 may include commands, scripts, or other code to cause host interfaces for controlling the respective storage volumes to implement the prescriptions. For example, services such as Amazon® Web Services (AWS), Google® Compute Engine, Microsoft® Azure, or other cloud computing services, may maintain host interfaces (e.g., web interfaces, application programming interfaces, or other interfaces) by which clients may define operation of the storage volumes. The RSSL 200 may use the communication interfaces 312 to send the operation-rate tokens to the host interfaces (238).

The RSSL 200 may store a command history of received commands and adjustments from the RS control interface 164. The RSSL 200 may access this command history and treat the commands as feedback the prescriptions generated by the RSSL 200. The RSSL may apply machine learning techniques to generate predicted operator adjustments to the prescriptions and present the predicted operator adjustments as options in the RS-window presentation 166.

In some cases, the RSSL 200 may initiate rate sizing via the data export layer 170. The data export layer 170 may format the reservation matrix in one or more formats for transfer. For example the data export layer 170 may support format translation to java script object notation (JSON), eXtensible markup language (XML), comma separated value (CSV), Tableau Workbook (TBWX), hyper-text markup language (HTML) or other formats. The data export layer 170 may also support transfer of the operation-rate tokens in one or more states, such as flat file transfers, streaming transfers, web service access, internet protocol transfers, or other transfers.

Additionally or alternatively, the RSSL 200 may initiate rate sizing via the prescriptive engine layer 150 through direct transfer, direct network access, or other non-export transfer.

Figure 3:
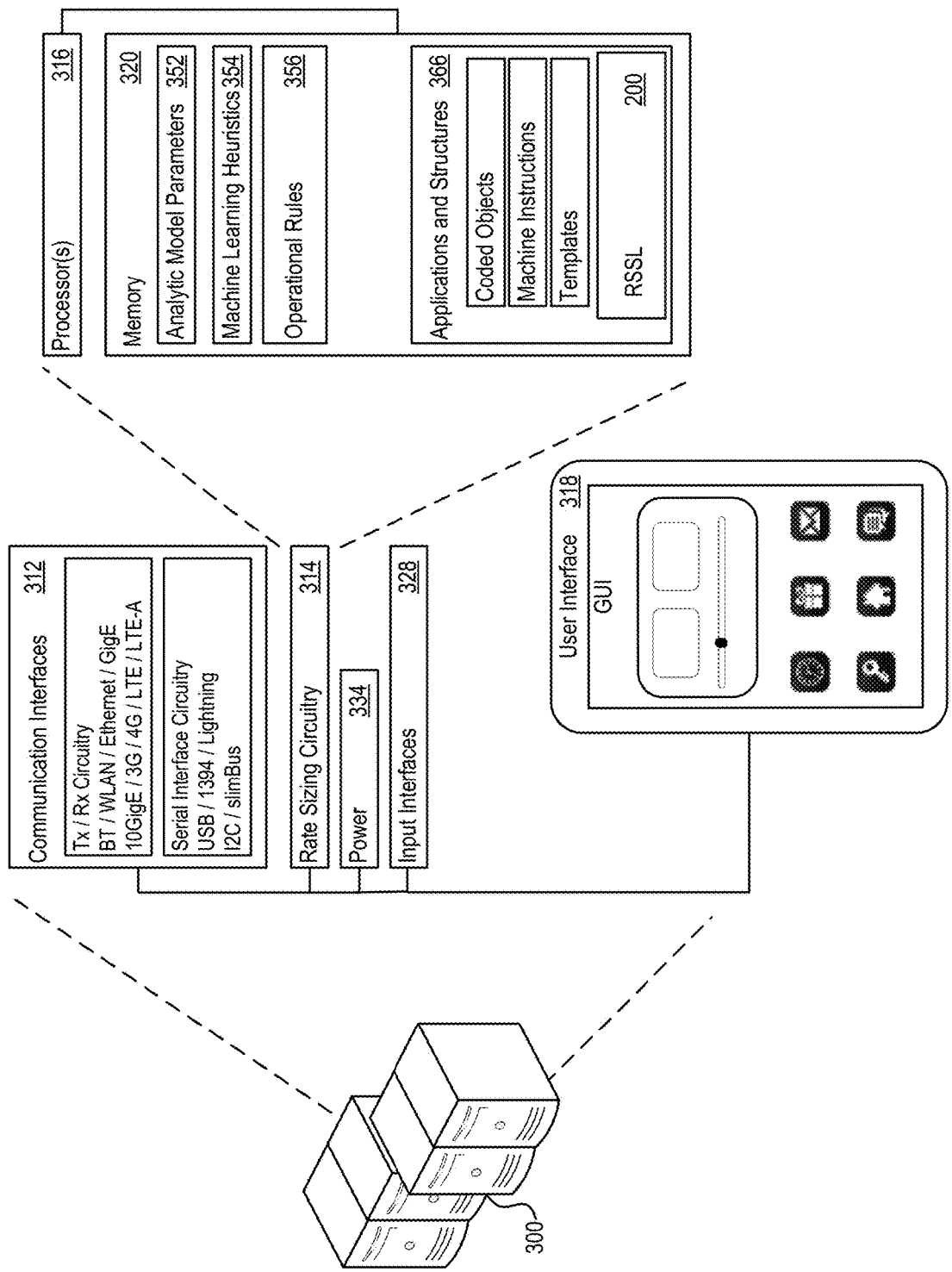
FIG. 3 shows an example specific execution environment for the rate sizing stack of FIG. 1.

FIG. 3 shows an example specific execution environment 300 for the rate sizing stack 100 described above. The execution environment 300 may include rate sizing circuitry 314 to support execution of the multiple layers of rate sizing stack 100 described above. The rate sizing circuitry 314 may include processors 316, memory 320, and/or other circuitry.

The memory 320 may include analytic model parameters 352, machine learning heuristics 354, and operational rules 356. The memory 320 may further include applications and structures 366, for example, coded objects, machine instructions, templates, or other structures to support operation pattern data generation, operation-rate comparison, or other tasks described above. The applications and structures may implement the RSSL 200.

The execution environment 300 may also include communication interfaces 312, which may support wireless, e.g. Bluetooth, Wi-Fi, WLAN, cellular (4G, LTE/A), and/or wired, Ethernet, Gigabit Ethernet, optical networking protocols. The communication interfaces 312 may also include serial interfaces, such as universal serial bus (USB), serial ATA, IEEE 1394, lighting port, I²C, slimBus, or other serial interfaces. The communication interfaces 312 may be used to support and/or implement remote operation of the RS control interface 164. The execution environment 300 may include power functions 334 and various input interfaces 328. The execution environment may also include a user interface 318 that may include human-to-machine interface devices and/or graphical user interfaces (GUI). The user interface 318 may be used to support and/or implement local operation of the RS control interface 164. In various implementations, the rate sizing circuitry 314 may be distributed over one or more physical servers, be implemented as one or more virtual machines, be implemented in container environments such as Cloud Foundry or Docker, and/or be implemented in Serverless (functions as-a-Service) environments.

In some cases, the execution environment 300 may be a specially-defined computational system deployed in a cloud platform. In some cases, the parameters defining the execution environment may be specified in a manifest for cloud deployment. The manifest may be used by an operator to requisition cloud based hardware resources, and then deploy the software components, for example, the rate sizing stack 100, of the execution environment onto the hardware resources. In some cases, a manifest may be stored as a preference file such as a YAML (yet another mark-up language), JSON, or other preference file type.

Figure 4:
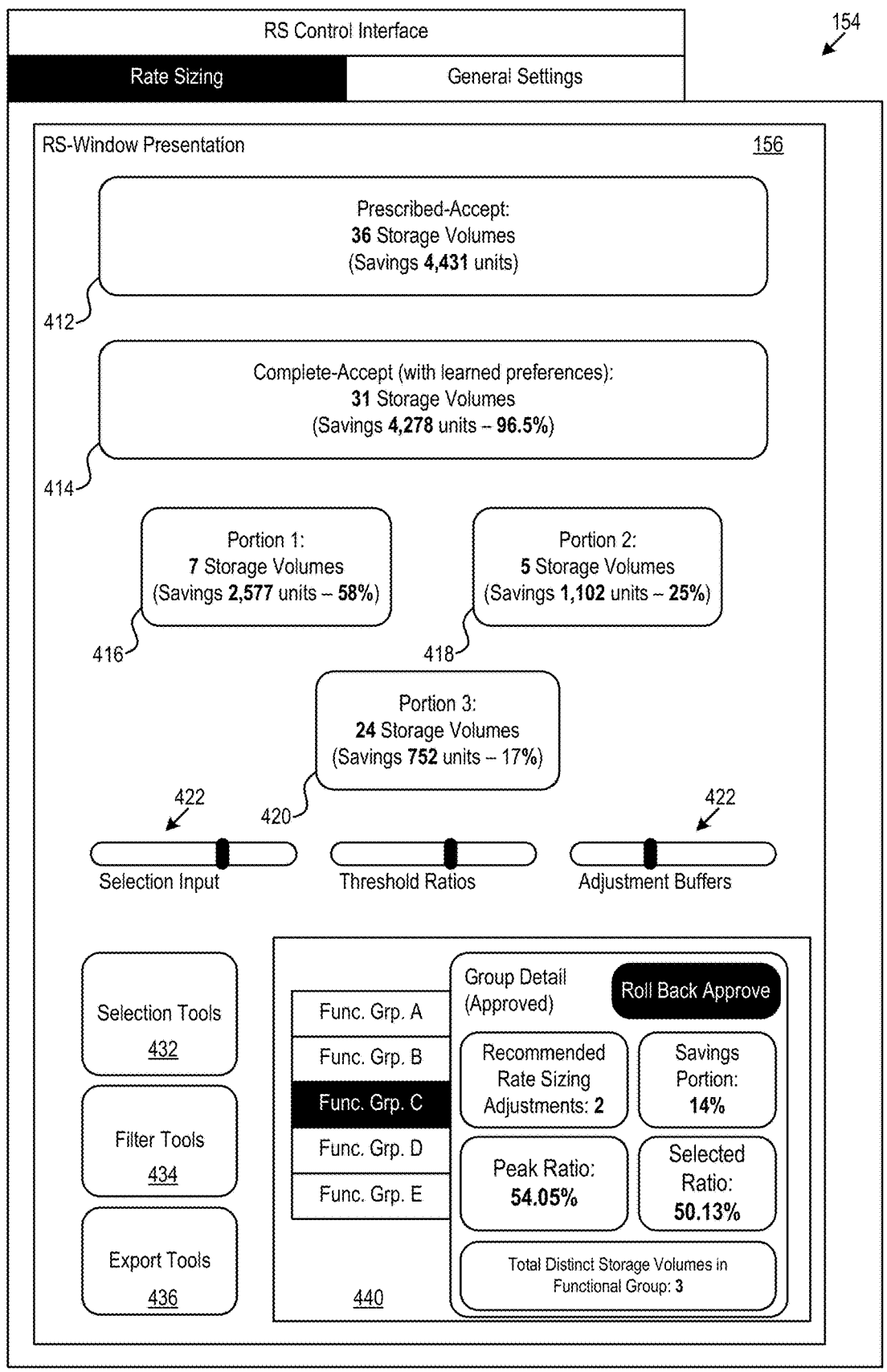
FIG. 4 shows an example rate sizing control interface.

Referring now to FIG. 4, an example RS control interface 164 is shown. The RS control interface 164 includes an example RS-window presentation 166 as discussed above. The RS-window presentation 166 may include multiple selectable options 412, 414, 416, 418, 420, 422 and data regarding the prescriptive allowed operation-rates 154 and/or class placement prescriptions adjustments before and after alteration to accommodate the learned preferences of the operator. In this example scenario, the selectable options may include a prescribed-accept option 412 to implement some or all of the prescribed rate sizing adjustments as a group without alteration based on learned preferences, a complete-accept option 414 to implement the rate sizing adjustments with alterations based on learned preferences, options 416, 418, 420 to implement augments to selected subsets of the computing resources, option 422 to adjust preferences (e.g., selection inputs, threshold ratios, adjustment buffers or other rate sizing analysis inputs) and re-run the routine at the prescriptive engine layer 150, or other selectable options to control the eventual operation-rate token output.

Additionally or alternatively, the RS-window presentation 166 may include selection and filter tools 432, 434 to support granular manipulation of the sizing adjustments, e.g., by storage vole, by functional group, resource region, operating system, or other granular manipulation. The RS-window presentation 166 may also include export tools 436 for management of data export layer 170 operations.

In some implementations, the RS-window presentation 166 may include a functional group detail panel 440 for management of group-level selectable options such as group level approvals of operation-rates. Additionally or alternatively, the functional group detail panel 440 may display group-level information regarding operation-rate reservation. Functional group detail panel 440 may also provide an option to roll back previously approved operation-rate reservations.

In the example, shown in FIG. 4, the options 416, 418, 420 allow for manipulation of selected subsets of the computing resources. For example, as shown the example routine in table two, the rate sizing adjustments may be "binned" into consumption savings classes. For example, "high", "medium", and "low" consumption savings bins may allow the operator to select specific groups of rate sizing adjustments. The options 416, 418, 420 show the respective portions of the total consumption savings that may be achieved by adjusting each specific subset of the storage volumes. In the example, the first subset option 416 provides the greatest marginal consumption savings, while the options 418, 420 provide successively smaller marginal consumption savings.

Figure 5:
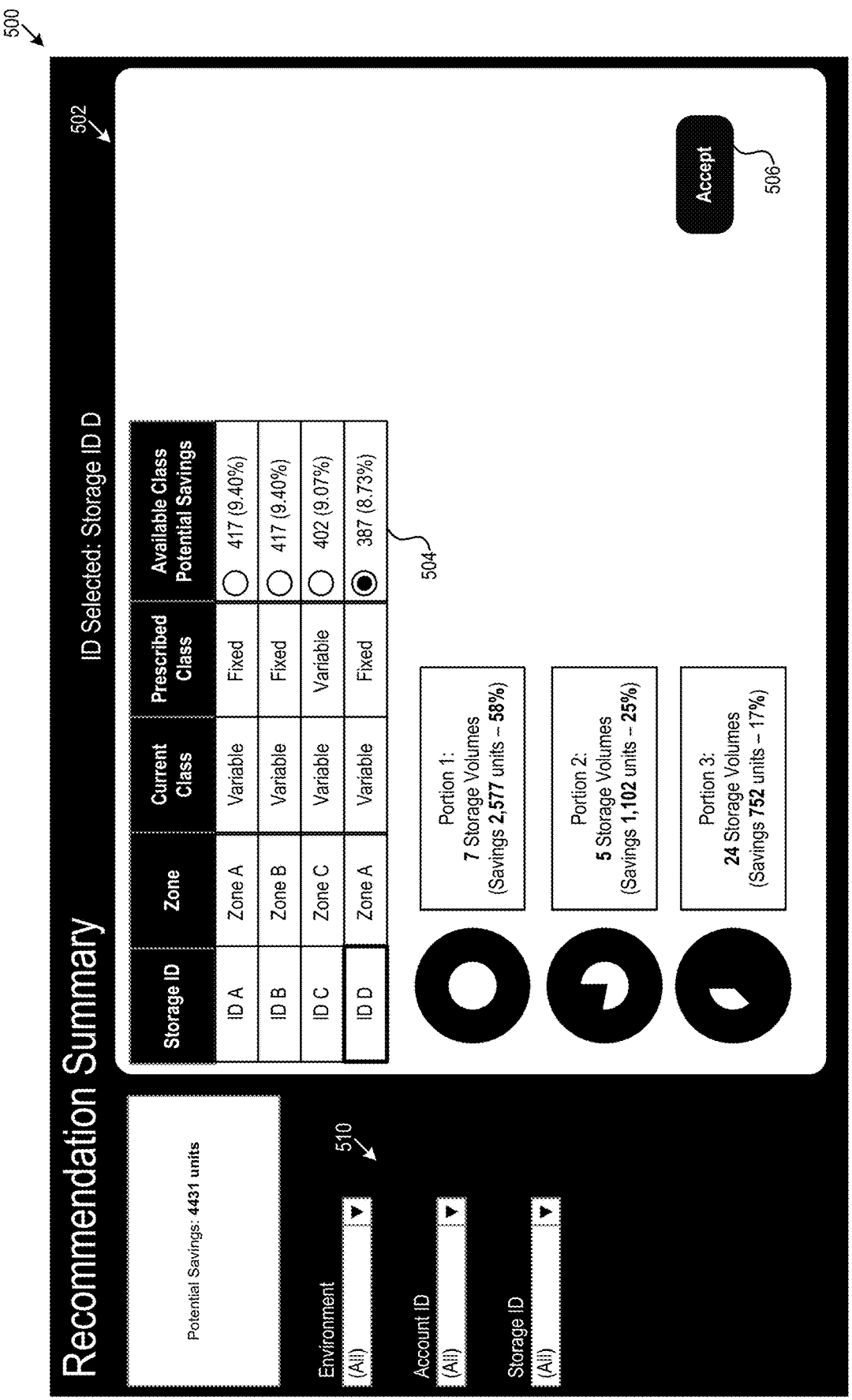
FIG. 5 shows a second example rate sizing control interface.

FIG. 5 shows a second example RS control interface 500. In the second example RS control interface 500, the RS-window presentation 502 is storage identifier (e.g., a specific and/or unique designation for a given storage volume) specific. The RS-window presentation 502 provides detail panels 504 with regard to consumption savings for the selected storage identifier (storage ID). Selections based on operator preferences may be made within the detail panels 504. The RS-window presentation 502 may further include options 506 for confirm operator selections. The RS control interface 500 may further include tools 510 for filtering and selecting storage identifiers for detail display within the example RS-window presentation 502.

Figure 6:
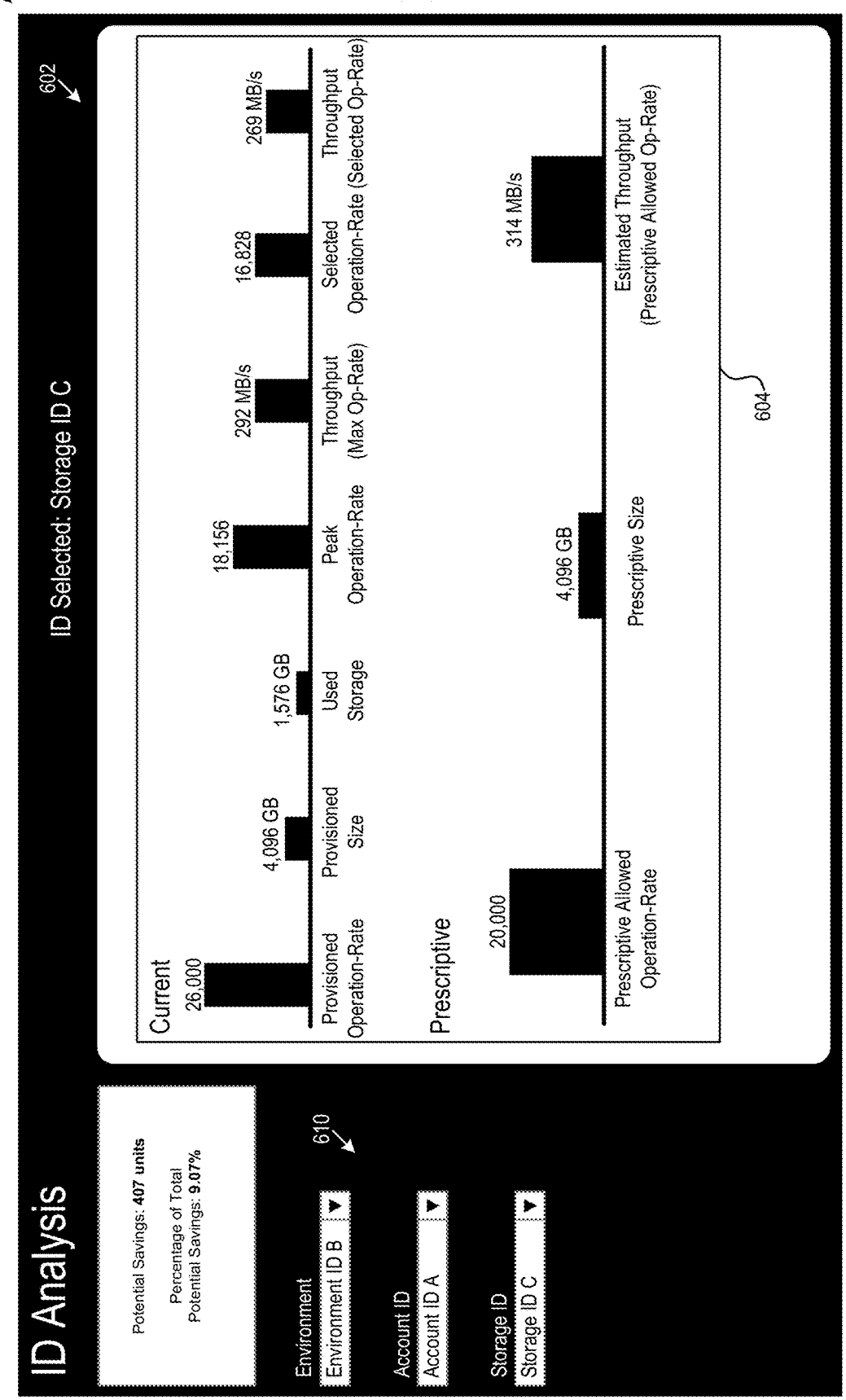
FIG. 6 shows a third example rate sizing control interface.

FIG. 6 shows a third example RS control interface 600. In the third example RS control interface 600, the RS-window presentation 602 is storage identifier (e.g., a specific and/or unique designation for a given storage volume) specific. The RS-window presentation 602 provides detail panels 604 with regard to consumption savings for the selected storage identifier (storage ID) and detail information regarding current provisioning and usage in an example histogram-based layout. For example, the detail panel 604 may show a provisioned allowed operation-rate, a provisioned size (e.g., storage volume), current storage usage, a peak operation-rate, a selected operation-rate, a prescriptive allowed operation-rate, a prescriptive size, and throughputs corresponding to various operation-rates. The RS control interface 600 may further include tools 610 for filtering and selecting storage identifiers for detail display within the example RS-window presentation 602.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations may use the techniques and architectures described above.

A1 In an example, a system includes: network interface circuitry configured to: receive historical operation-rate data for a storage volume; receive consumption metric data for the storage volume; receive selection input for the storage volume; and send an operation-rate token to a host interface configured to control operation-rate allowance for the storage volume; and rate sizing circuitry in data communication with the network interface circuitry, the rate sizing circuitry configured to execute an rate sizing stack, the rate sizing stack including: a data staging layer; an input layer; a configuration layer; and a prescriptive engine layer; the rate sizing circuitry configured to: parse, at the input layer, the operation-rate data and the consumption metric data to generate operation pattern data; store, via a database operation at the data staging layer, the operation pattern data; access, at the configuration layer, the operation pattern data using a memory resource provided by the data staging layer; establish, at the configuration layer, a selected interval for rate distribution parsing; establish, at the configuration layer, a selection criterion for the selected storage volume responsive to the selection input; parse the operation pattern data, at the prescriptive engine layer, multiple operation-rates for multiple intervals within the operation pattern data; select a selected operation-rate from among the multiple operation-rates based on the selection criterion; identify a peak operation-rate from among the multiple operation-rates, the peak operation-rate greater than the selected operation-rate; perform a comparison among the peak operation-rate, the selected operation-rate, and a provisioned allowed operation-rate; based on the comparison, determine a prescriptive allowed operation-rate, the prescriptive allowed operation-rate greater than or equal to the selected operation-rate; when the peak operation-rate is below a static threshold operation-rate, generate, at the prescriptive engine layer, the operation-rate token, the operation-rate token including instructions requesting placement of the storage volume in a fixed operation-rate storage class; and when the peak operation-rate is above the static threshold operation-rate, generate, at the prescriptive engine layer, the operation-rate token, the operation-rate token including instructions requesting operation-rate reservation for the storage volume consistent with the prescriptive allowed operation-rate.

A2 The system of example A1, where: the rate sizing stack further includes a presentation layer; and the rate sizing circuitry is further configured to generate, at the presentation layer and before generating the operation-rate token, an RS control interface, the RS control interface configured to receive operator feedback responsive to the prescriptive allowed operation-rate.

A3 The system of example A2, where based on the operator feedback, the rata sizing circuitry is configure to alter a predicted operator adjustment, the predicted operator adjustment used to determine a future prescriptive allowed operation-rate.

A4 The system of example A2, where the RS control interface is further includes an RS-window presentation, the RS-window presentation configured to display an option based on the prescriptive allowed operation-rate.

A5 The system of any of examples A1-A4, where: the network interface circuitry is further configured to receive tagging data for a functional grouping of technical components that includes the storage volume; and the selection input is associated with the functional grouping.

A6 The system of any of examples A1-A5, where the operation-rate data includes data from a 90-day analysis window.

A7 The system of any of examples A1-A6, where selection criterion includes a percentile value, one or more standard deviations, a predefined offset from a median value, an inflection point value, or any combination thereof.

A8 The system of example A7, where the selection criterion includes a $99^{th}$ percentile value from among the multiple operation-rates.

A9 The system of any of examples A1-A8, where the peak operation-rate includes the highest operation-rate from among the multiple operation-rates.

A10 The system of any of examples A1-A9, where the rate sizing circuitry is configured to perform the comparison among the peak operation-rate, the selected operation-rate, and the provisioned allowed operation-rate by: defining a selected ratio including a ratio of the selected operation-rate to the provisioned allowed operation-rate; and defining a peak ratio including a ratio of the peak operation-rate to the provisioned allowed operation-rate.

A11 The system of example A10, where the rate sizing circuitry is further configured to: obtain a comparison result operation-rate during the comparison among the peak operation-rate, the selected operation-rate, and the provisioned allowed operation-rate; and define a selected buffer adjustment by which to adjust the comparison result operation-rate to obtain the prescriptive allowed operation-rate.

A12 The system of example A11, where the rate sizing circuitry is configured to select the selected operation-rate as the comparison result operation-rate when the selected ratio is below a specific threshold and a difference between the selected ratio and the peak ratio is greater than a complement to the specific threshold.

A13 The system of either of examples A11 or A12, where the rate sizing circuitry is configured to select the peak operation-rate as the comparison result operation-rate when the selected ratio is below a specific threshold and a difference between the selected ratio and the peak ratio is less than a complement to the specific threshold.

A14 The system of any of examples A11-A13, where rate sizing circuitry is further configured to: define a specific buffer adjustment by which to adjust the comparison result operation-rate to obtain the prescriptive allowed operation-rate, the specific buffer adjustment being larger than the selected buffer adjustment; when the selected ratio is above a specific threshold and a difference between the selected ratio and the peak ratio is greater than half of a complement to the specific threshold select the selected operation-rate as the comparison result operation-rate; when the selected ratio is above a specific threshold and a difference between the selected ratio and the peak ratio is less than half of a complement to the specific threshold select the peak operation-rate as the comparison result operation-rate; and adjust the comparison result operation-rate in accord with the specific buffer to obtain the prescriptive allowed operation-rate.

B1 In an example, a method includes: at network interface circuitry: receiving historical operation-rate data for a storage volume; receiving consumption metric data for the storage volume; and receiving selection input for the storage volume; at rate sizing circuitry in data communication with the network interface circuitry, the rate sizing circuitry executing an rate sizing stack: parsing, at an input layer of the rate sizing stack, the operation-rate data and the consumption metric data to generate operation pattern data; storing, via a database operation at the data staging layer, the operation pattern data; accessing, at a configuration layer of the rate sizing stack, the operation pattern data using a memory resource provided by the data staging layer; establishing, at the configuration layer, a selected interval for rate distribution parsing; establishing, at the configuration layer, a selection criterion for the selected storage volume responsive to the selection input; parsing the operation pattern data, at a prescriptive engine layer of the rate sizing stack, multiple operation-rates for multiple intervals within the operation pattern data; selecting a selected operation-rate from among the multiple operation-rates based on the selection criterion; identifying a peak operation-rate from among the multiple operation-rates, the peak operation-rate greater than the selected operation-rate; performing a comparison among the peak operation-rate, the selected operation-rate, and a provisioned allowed operation-rate; based on the comparison, determining a prescriptive allowed operation-rate, the prescriptive allowed operation-rate greater than or equal to the selected operation-rate; when the peak operation-rate is below a static threshold operation-rate, generating, at the prescriptive engine layer, the operation-rate token, the operation-rate token including instructions requesting placement of the storage volume in a fixed operation-rate storage class; and when the peak operation-rate is above the static threshold operation-rate, generating, at the prescriptive engine layer, the operation-rate token, the operation-rate token including instructions requesting operation-rate reservation for the storage volume consistent with the prescriptive allowed operation-rate; and sending, via the network interface circuitry, the operation-rate token to a host interface configured to control operation-rate allowance for the storage volume.

B2 The method of example B1, where performing the comparison among the peak operation-rate, the selected operation-rate, and the provisioned allowed operation-rate includes: defining a selected ratio including a ratio of the selected operation-rate to the provisioned allowed operation-rate; and defining a peak ratio including a ratio of the peak operation-rate to the provisioned allowed operation-rate.

B3 The method of either of examples B1 or B2, where the method further includes: obtaining a comparison result operation-rate during the comparison among the peak operation-rate, the selected operation-rate, and the provisioned allowed operation-rate; and defining a selected buffer adjustment by which to adjust the comparison result operation-rate to obtain the prescriptive allowed operation-rate.

C1 In an example, a product includes: machine-readable media other than a transitory signal; and instructions stored on the machine-readable media, the instructions configured to, when executed, cause a machine to: at network interface circuitry: receive historical operation-rate data for a storage volume; receive consumption metric data for the storage volume; receive selection input for the storage volume; and at rate sizing circuitry in data communication with the network interface circuitry, the rate sizing circuitry executing an rate sizing stack: parse, at an input layer of the rate sizing stack, the operation-rate data and the consumption metric data to generate operation pattern data; store, via a database operation at the data staging layer, the operation pattern data; access, at a configuration layer of the rate sizing stack, the operation pattern data using a memory resource provided by the data staging layer; establish, at the configuration layer, a selected interval for rate distribution parsing; establish, at the configuration layer, a selection criterion for the selected storage volume responsive to the selection input; parse the operation pattern data, at a prescriptive engine layer of the rate sizing stack, multiple operation-rates for multiple intervals within the operation pattern data; select a selected operation-rate from among the multiple operation-rates based on the selection criterion; identify a peak operation-rate from among the multiple operation-rates, the peak operation-rate greater than the selected operation-rate; perform a comparison among the peak operation-rate, the selected operation-rate, and a provisioned allowed operation-rate; based on the comparison, determine a prescriptive allowed operation-rate, the prescriptive supported operation-rate greater than or equal to the selected operation-rate; when the peak operation-rate is below a static threshold operation-rate, generate, at the prescriptive engine layer, the operation-rate token, the operation-rate token including instructions requesting placement of the storage volume in a fixed operation-rate storage class; and when the peak operation-rate is above the static threshold operation-rate, generate, at the prescriptive engine layer, the operation-rate token, the operation-rate token including instructions requesting operation-rate reservation for the storage volume consistent with the prescriptive allowed operation-rate; and send, via the network interface circuitry, the operation-rate token to a host interface configured to control operation-rate allowance for the storage volume.

C2 The product of example C1, where the instructions are configured to cause the machine to perform the comparison among the peak operation-rate, the selected operation-rate, and the provisioned allowed operation-rate by: defining a selected ratio including a ratio of the selected operation-rate to the provisioned allowed operation-rate; defining a peak ratio including a ratio of the peak operation-rate to the provisioned allowed operation-rate; obtaining a comparison result operation-rate during the comparison among the peak operation-rate, the selected operation-rate, and the provisioned allowed operation-rate; and defining a selected buffer adjustment by which to adjust the comparison result operation-rate to obtain the prescriptive allowed operation-rate.

C3 The product of example C2, where the instructions are configured to cause the machine to: select the selected operation-rate as the comparison result operation-rate when the selected ratio is below a specific threshold and a difference between the selected ratio and the peak ratio is greater than a complement to the specific threshold; and select the peak operation-rate as the comparison result operation-rate when the selected ratio is below a specific threshold and a difference between the selected ratio and the peak ratio is less than a complement to the specific threshold.

D1 A method implemented by operation of a system of any of examples A1-A14.

E1 A product including instructions stored on a machine readable medium, the instructions configured to cause a machine to implement the method of example D1.

Various implementations have been specifically described. However, many other implementations are also possible.

What is claimed is:

1. A system including:
   network interface circuitry configured to:
      receive historical operation-rate data for a storage volume;
      receive consumption metric data for the storage volume;
      receive selection input for the storage volume; and
      send an operation-rate token to a host interface configured to control operation-rate allowance for the storage volume; and
   rate sizing circuitry in data communication with the network interface circuitry, the rate sizing circuitry configured to execute a rate sizing stack,
   the rate sizing stack including:
      a data staging layer;
      an input layer;
      a configuration layer; and
      a prescriptive engine layer;
   the rate sizing circuitry configured to:
      parse, at the input layer, the operation-rate data and the consumption metric data to generate operation pattern data;
      store, via a database operation at the data staging layer, the operation pattern data;
      access, at the configuration layer, the operation pattern data using a memory resource provided by the data staging layer;
      establish, at the configuration layer, a selected interval for rate distribution parsing;
      establish, at the configuration layer, a selection criterion for the storage volume responsive to the selection input;
      parse the operation pattern data, at the prescriptive engine layer, multiple operation-rates for multiple intervals within the operation pattern data;
      select a selected operation-rate from among the multiple operation-rates based on the selection criterion;
      identify a peak operation-rate from among the multiple operation-rates, the peak operation-rate greater than the selected operation-rate;
      perform a comparison among the peak operation-rate, the selected operation-rate, and a provisioned allowed operation-rate;
      based on the comparison, determine a prescriptive allowed operation-rate, the prescriptive allowed operation-rate greater than or equal to the selected operation-rate;
      when the peak operation-rate is below a static threshold operation-rate, generate, at the prescriptive engine layer, the operation-rate token, the operation-rate token including instructions requesting placement of the storage volume in a fixed operation-rate storage class; and
      when the peak operation-rate is above the static threshold operation-rate, generate, at the prescriptive engine layer, the operation-rate token, the operation-rate token including instructions requesting operation-rate reservation for the storage volume consistent with the prescriptive allowed operation-rate.

2. The system of claim 1, where:
   the rate sizing stack further includes a presentation layer; and
   the rate sizing circuitry is further configured to generate, at the presentation layer and before generating the operation-rate token, a rate sizing (RS) control interface, the RS control interface configured to receive operator feedback responsive to the prescriptive allowed operation-rate.

3. The system of claim 2, where based on the operator feedback, the rate sizing circuitry is configure to alter a predicted operator adjustment, the predicted operator adjustment used to determine a future prescriptive allowed operation-rate.

4. The system of claim 2, where the RS control interface is further includes a RS-window presentation, the RS-window presentation configured to display an option based on the prescriptive allowed operation-rate.

5. The system of claim 1, where:
   the network interface circuitry is further configured to receive tagging data for a functional grouping of technical components that includes the storage volume; and
   the selection input is associated with the functional grouping.

6. The system of claim 1, where the operation-rate data includes data from a 90-day analysis window.

7. The system of claim 1, where selection criterion includes a percentile value, one or more standard deviations, a predefined offset from a median value, an inflection point value, or any combination thereof.

8. The system of claim 7, where the selection criterion includes a $99^{th}$ percentile value from among the multiple operation-rates.

9. The system of claim 1, where the peak operation-rate includes a highest operation-rate from among the multiple operation-rates.

10. The system of claim 1, where the rate sizing circuitry is configured to perform the comparison among the peak operation-rate, the selected operation-rate, and the provisioned allowed operation-rate by:
    defining a selected ratio including a ratio of the selected operation-rate to the provisioned allowed operation-rate; and
    defining a peak ratio including a ratio of the peak operation-rate to the provisioned allowed operation-rate.

11. The system of claim 10, where the rate sizing circuitry is further configured to:
    obtain a comparison result operation-rate during the comparison among the peak operation-rate, the selected operation-rate, and the provisioned allowed operation-rate; and
    define a selected buffer adjustment by which to adjust the comparison result operation-rate to obtain the prescriptive allowed operation-rate.

12. The system of claim 11, where the rate sizing circuitry is configured to select the selected operation-rate as the comparison result operation-rate when the selected ratio is below a specific threshold and a difference between the selected ratio and the peak ratio is greater than a complement to the specific threshold.

13. The system of claim 11, where the rate sizing circuitry is configured to select the peak operation-rate as the comparison result operation-rate when the selected ratio is below a specific threshold and a difference between the selected ratio and the peak ratio is less than a complement to the specific threshold.

14. The system of claim 11, where rate sizing circuitry is further configured to:

define a specific buffer adjustment by which to adjust the comparison result operation-rate to obtain the prescriptive allowed operation-rate, the specific buffer adjustment being larger than the selected buffer adjustment;

when the selected ratio is above a specific threshold and a difference between the selected ratio and the peak ratio is greater than half of a complement to the specific threshold select the selected operation-rate as the comparison result operation-rate;

when the selected ratio is above a specific threshold and a difference between the selected ratio and the peak ratio is less than half of a complement to the specific threshold select the peak operation-rate as the comparison result operation-rate; and adjust the comparison result operation-rate in accord with the specific buffer adjustment to obtain the prescriptive allowed operation-rate.

15. A method including:
at network interface circuitry:
    receiving historical operation-rate data for a storage volume;
    receiving consumption metric data for the storage volume; and
    receiving selection input for the storage volume;
at rate sizing circuitry in data communication with the network interface circuitry, the rate sizing circuitry executing a rate sizing stack:
    parsing, at an input layer of the rate sizing stack, the operation-rate data and the consumption metric data to generate operation pattern data;
    storing, via a database operation at a data staging layer of the rate sizing stack, the operation pattern data;
    accessing, at a configuration layer of the rate sizing stack, the operation pattern data using a memory resource provided by the data staging layer;
    establishing, at the configuration layer, a selected interval for rate distribution parsing;
    establishing, at the configuration layer, a selection criterion for the storage volume responsive to the selection input;
    parsing the operation pattern data, at a prescriptive engine layer of the rate sizing stack, multiple operation-rates for multiple intervals within the operation pattern data;
    selecting a selected operation-rate from among the multiple operation-rates based on the selection criterion;
    identifying a peak operation-rate from among the multiple operation-rates, the peak operation-rate greater than the selected operation-rate;
    performing a comparison among the peak operation-rate, the selected operation-rate, and a provisioned allowed operation-rate;
    based on the comparison, determining a prescriptive allowed operation-rate, the prescriptive allowed operation-rate greater than or equal to the selected operation-rate;
    when the peak operation-rate is below a static threshold operation-rate, generating, at the prescriptive engine layer, an operation-rate token, the operation-rate token including instructions requesting placement of the storage volume in a fixed operation-rate storage class; and
    when the peak operation-rate is above the static threshold operation-rate, generating, at the prescriptive engine layer, the operation-rate token, the operation-rate token including instructions requesting operation-rate reservation for the storage volume consistent with the prescriptive allowed operation-rate; and
    sending, via the network interface circuitry, the operation-rate token to a host interface configured to control operation-rate allowance for the storage volume.

16. The method of claim 15, where performing the comparison among the peak operation-rate, the selected operation-rate, and the provisioned allowed operation-rate includes:
    defining a selected ratio including a ratio of the selected operation-rate to the provisioned allowed operation-rate; and
    defining a peak ratio including a ratio of the peak operation-rate to the provisioned allowed operation-rate.

17. The method of claim 15, where the method further includes:
    obtaining a comparison result operation-rate during the comparison among the peak operation-rate, the selected operation-rate, and the provisioned allowed operation-rate; and
    defining a selected buffer adjustment by which to adjust the comparison result operation-rate to obtain the prescriptive allowed operation-rate.

18. A product including:
machine-readable media other than a transitory signal; and
instructions stored on the machine-readable media, the instructions configured to, when executed, cause a machine to:
    at network interface circuitry:
        receive historical operation-rate data for a storage volume;
        receive consumption metric data for the storage volume;
        receive a selection input for the storage volume; and
    at rate sizing circuitry in data communication with the network interface circuitry, the rate sizing circuitry executing a rate sizing stack:
        parse, at an input layer of the rate sizing stack, the operation-rate data and the consumption metric data to generate operation pattern data;
        store, via a database operation at a data staging layer of the rate sizing stack, the operation pattern data;
        access, at a configuration layer of the rate sizing stack, the operation pattern data using a memory resource provided by the data staging layer;
        establish, at the configuration layer, a selected interval for rate distribution parsing;
        establish, at the configuration layer, a selection criterion for the storage volume responsive to the selection input;
        parse the operation pattern data, at a prescriptive engine layer of the rate sizing stack, multiple operation-rates for multiple intervals within the operation pattern data;
        select a selected operation-rate from among the multiple operation-rates based on the selection criterion;
        identify a peak operation-rate from among the multiple operation-rates, the peak operation-rate greater than the selected operation-rate;
        perform a comparison among the peak operation-rate, the selected operation-rate, and a provisioned allowed operation-rate;

based on the comparison, determine a prescriptive allowed operation-rate, the prescriptive allowed operation-rate greater than or equal to the selected operation-rate;

when the peak operation-rate is below a static threshold operation-rate, generate, at the prescriptive engine layer, an operation-rate token, the operation-rate token including instructions requesting placement of the storage volume in a fixed operation-rate storage class; and when the peak operation-rate is above the static threshold operation-rate, generate, at the prescriptive engine layer, the operation-rate token, the operation-rate token including instructions requesting operation-rate reservation for the storage volume consistent with the prescriptive allowed operation-rate; and send, via the network interface circuitry, the operation-rate token to a host interface configured to control operation-rate allowance for the storage volume.

19. The product of claim 18, where the instructions are configured to cause the machine to perform the comparison among the peak operation-rate, the selected operation-rate, and the provisioned allowed operation-rate by:

defining a selected ratio including a ratio of the selected operation-rate to the provisioned allowed operation-rate;

defining a peak ratio including a ratio of the peak operation-rate to the provisioned allowed operation-rate;

obtaining a comparison result operation-rate during the comparison among the peak operation-rate, the selected operation-rate, and the provisioned allowed operation-rate; and defining a selected buffer adjustment by which to adjust the comparison result operation-rate to obtain the prescriptive allowed operation-rate.

20. The product of claim 19, where the instructions are configured to cause the machine to:

select the selected operation-rate as the comparison result operation-rate when the selected ratio is below a specific threshold and a difference between the selected ratio and the peak ratio is greater than a complement to the specific threshold; and select the peak operation-rate as the comparison result operation-rate when the selected ratio is below a specific threshold and a difference between the selected ratio and the peak ratio is less than a complement to the specific threshold.

* * * * *